G. M. BROWN.
CARBURETER.
APPLICATION FILED JULY 10, 1916.

1,255,077.  Patented Jan. 29, 1918.

Inventor:
George M. Brown,
by
Attorneys

UNITED STATES PATENT OFFICE.

GEORGE M. BROWN, OF CAMBRIDGE, MASSACHUSETTS.

CARBURETER.

1,255,077.   Specification of Letters Patent.   Patented Jan. 29, 1918.

Application filed July 10, 1916. Serial No. 108,282.

*To all whom it may concern:*

Be it known that I, GEORGE M. BROWN, a citizen of the United States, and resident of Cambridge, in the county of Middlesex and State of Massachusetts, have invented new and useful Improvements in Carbureters, of which the following is a specification.

The invention consists in a group of functionally related factors of which the coöperative performance insures a practically perfect gaseous mixture of air and vaporized volatile fuel and automatically regulates the proportion of air and fuel to suit varying conditions imposed by the motor which is supplied by the carbureter, and by external conditions of temperature and humidity of the surrounding air.

A factor which characterizes my invention in its more generic aspect is a centrifugal separator, which coöperates functionally with the air supply, volatile liquid fuel supply, and air-and-fuel mixture duct. The primary function which the centrifugal separator performs in this environment is the separation from the gaseous content of the carbureter of that portion of volatile fuel which persists in liquid form, so that only completely volatilized fuel is allowed to pass to the engine in mixture with air. A secondary, but none the less quite important, function, performed by the centrifugal separator in what I conceive to be the best example of my invention, is supplying compensatory fuel vapor by evaporation of liquid volatile fuel from the surfaces of the separator, an evaporation which automatically maintains a proper fuel-proportion in the combustible mixture supplied to the engine, and automatically adjusts the inspirative draft upon the liquid fuel supply duct.

Another factor contributing to the characteristics of my invention involves the disposition and the shape of the opening from the main mixing chamber into the mixture delivery duct. The opening is preferably displaced with relation to the direct path of the current of air entering and passing across the mixing chamber whereby the current of air is not permitted to pass directly through the chamber but is caused to be circulated therein and thus become more thoroughly commingled with the fuel. The opening is preferably angularly disposed with relation to the outlet duct so that, with relation to one side of the opening, the other side of the opening is displaced along the outlet duct in the direction of the motor or other apparatus and inasmuch as the current of air is caused to flow through the mixing chamber by virtue of a reduction of pressure in the outlet duct the side of the angularly disposed opening which is displaced in the direction of the motor is in a region of slightly lower pressure than the side of the opening more remote from the motor, the difference in pressure between the two sides depending upon the degree of angularity of the opening with relation to the outlet duct, that is, upon the amount of displacement along the outlet duct of one side with relation to the other side of the opening, the pressure between the two sides varying between the limits of the two side pressures. The opening into the outlet duct is also preferably disposed in angular relation to the current of air through the mixing chamber and is preferably positioned with relation to the fuel duct so that a current of air passing from the inlet duct to the side of the outlet duct opening displaced along the outlet duct in the direction of the motor will pass the fuel duct along a path displaced from the fuel duct at a greater distance than the path of a current of air from the inlet duct to the opposite side of the outlet duct opening.

When the motor is running light and is producing a comparatively low degree of suction, a current of air of comparatively small volume passes across the mixing chamber in the direction of the side of the outlet opening of lowest pressure inasmuch as a current of small volume can pass out through the one side of the opening, although it is to be understood that only the main portion of the current of air is here referred to and that some air will pass out through other portions of the outlet opening. The path of this small current of air is considerably removed from the fuel duct inasmuch as it is directed toward the side of the outlet duct opening which is displaced in the direction of the motor and consequently the small current of air inspirates a correspondingly small amount of liquid from the fuel duct. As the motor increases in speed and consequently draws a greater volume of air through the mixing chamber, not only does the velocity of the current of air increase, thereby increasing the amount of fuel inspirated from the fuel duct, but the path of the current of air is displaced toward the fuel duct inasmuch as the increasing volume of air cannot pass out of the chamber through the one side of the fuel duct opening and consequently spreads out over increasing areas of the opening, it still being remembered that only the main draft of air is being referred to. In other words, as the volume of the current of air increases its center line, or what might be termed its center of mass, moves in the direction of the fuel duct, thereby increasing the fuel inspirating action.

By suitably shaping the outlet duct opening and by suitably disposing it with relation to the inlet opening and the fuel duct, the fuel inspirating action can be caused to vary in any desired manner with relation to variations in the speed and the load of the motor. For example, by suitably shaping and disposing the opening the carbureter may be caused to supply a comparatively rich mixture when the motor is running comparatively slowly and to supply a somewhat more diluted mixture when the motor increases in speed, or vice versa, or to supply a mixture of constant proportions throughout variations in speed and in load. And the above described regulation of the richness of the mixture is attained entirely automatically, that is, without varying either the area of the air inlet opening or the area of the fuel duct or any other factor.

The above and other objects attained by my invention, as for example, increasing the range of usefulness of the carbureter by providing heating means therefor, will be apparent from the following description taken in connection with the accompanying drawings, in which—

Figure 1:
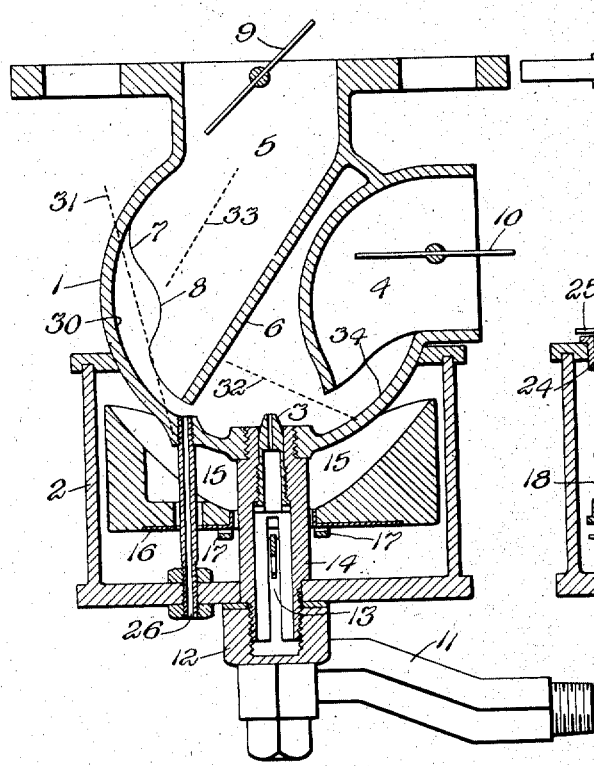
Figure 1 is a vertical, central section of one embodiment of my invention.
Figure 2:
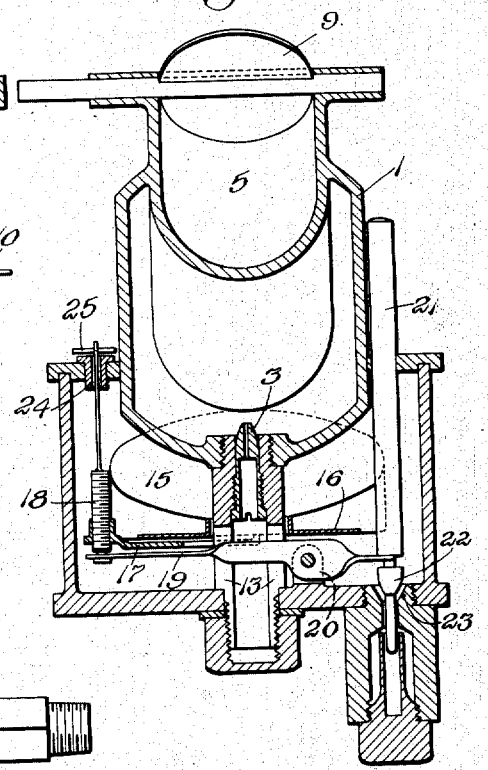
Fig. 2 is a vertical, central section taken at right angles to the section shown in Fig. 1.

The particular embodiment of my invention illustrated in Figs. 1 and 2 comprises a main mixing chamber 1, a float chamber 2, for supplying fuel to the mixing chamber through the fuel duct 3, an air inlet duct 4, and a mixture delivery duct 5. The mixing chamber 1 is, in general, preferably of substantially spherical form as shown in the drawings, and the inlet duct 4 and outlet duct 5 are preferably disposed on opposite sides of the chamber in such positions that the openings thereto are presented to the wall of the mixing chamber. The effective cross sectional area of the inlet opening is considerably greater than the effective cross sectional area of the outlet opening, that is, the inlet opening is capable of permitting a greater volume of air to flow therethrough, under given conditions of pressure, etc., than is the outlet opening. Of course the volume of air flowing into the device through the inlet opening is at all times equal to the volume of air flowing out through the outlet opening; nevertheless it is important to have the inlet opening considerably larger than the outlet opening as will be hereinafter more fully explained.

The inner wall of the inlet duct is preferably curved in substantially the manner illustrated, and preferably comprises an outward flare at its lower portion. The inner wall 6 of the outlet duct is preferably disposed across the mixing chamber at substantially the angle shown in Fig. 1, and has a curved contour as illustrated in Fig. 2, the curved wall serving as a baffle plate against which the incoming air and fuel impinge, whereby the two elements of the fuel mixture are more effectually commingled. The opening from the mixing chamber into the outlet duct is relatively long and narrow and has an arcuate disposition at one side of the mixing chamber. I have discovered that the particular shape and disposition of this opening is of the highest importance in attaining an automatic regulation of the richness of the fuel mixture, and I have found that for ordinary conditions the particular form illustrated is very successful. This form comprises an opening each side of which is very narrow at the top, as indicated at 7, and each side of which gradually becomes wider to the point 8 where it begins to become narrower as indicated. Inasmuch as it is important to dispose the nozzle of the fuel duct properly with relation to the current of air passing through the mixing chamber, the path of the current of air being determined by the shape and disposition of the inlet and outlet ducts, the nozzle is preferably made adjustable at least in the plane of the ducts as shown in the drawings.

A throttle valve 9 is preferably mounted in the outlet duct in the upper portion of the carbureter, and a valve 10 may if desired be mounted in the inlet duct to adjust the area of the inlet opening at various times to provide for variable conditions of use, although it is unnecessary to constantly operate the valve 10 in operating apparatus supplied with fuel by my improved carbureter, as my invention provides for the automatic regulation of the proportions of air and fuel supplied to the motor or other apparatus.

The fuel duct 3 is preferably disposed in the lower side of the mixing chamber so as to supply a jet of fuel into the central portion of the mixing chamber in the path of the current of air passing from the inlet opening across the mixing chamber toward the outlet opening, although my invention is in no way limited to this particular disposition of the fuel duct, it being obvious that the end thereof might be introduced into the mixing chamber at any desired angle with relation to the current of air passing through the chamber. For example, the fuel duct might be disposed either at one side or above the current of air, and the angle which the axis of the fuel duct makes with the current of air may obviously be varied within the scope of my invention, the angle shown being approximately 90°.

The float chamber 2 is preferably fitted around the mixing chamber 1 in order to bring the two chambers as close together as possible and thus economize space. The float chamber is supplied with fuel through pipe 11, hollow nut 12, and thence through openings 13 in the sides of the hollow pipe 14 threaded into the mixing chamber at its upper end and threaded into the nut 12 at its lower end, the hollow nozzle 3 comprising the fuel inlet duct, being threaded into the upper portion of the pipe 14, as shown in Figs. 1 and 2. The depth of fuel in the float chamber is automatically regulated by a float comprising two semi-circular cup-shaped members 15 mounted upon a metallic base 16 supported upon a member 17 having a threaded opening at its outer end adapted to receive the threaded member 18. The lower end of the member 18 is pivotally connected to one end of the lever 19 which in turn is pivotally connected to the members 20 projecting from the bottom of the float chamber. The other end of the lever 19 is recessed to receive a portion of reduced size of the pin 21 which comprises a valve 22 on its lower end coöperating with the valve seat 23 and which extends upwardly through the top of the float chamber to afford means for manually operating the valve in the event that it should stick or become clogged with dirt. The member 18 extends upwardly through a bushing 24 in the top of the float chamber and is provided with a knurled wheel 25 for rotating the member and thereby axially adjusting the member 17 thereon. The floats 15 and other parts to the left (Fig. 2) of the pivot 20 causes the left end of the lever 19 to be depressed when the float chamber is empty, thereby opening the valve 22 to its full extent. As the chamber is filled with liquid fuel the float is buoyed up, and as its weight is taken from the members 17 and 19 the weight of pin 21 causes the valve to close. By vertically adjusting the member 17 on the member 18 to the proper point the valve can be caused to close when the liquid has reached the desired depth in the chamber 2, and as liquid is drawn from the chamber due to the aspirating effect of the current of air through the mixing chamber the depth of the liquid is automatically maintained substantially constant.

Figure 3:
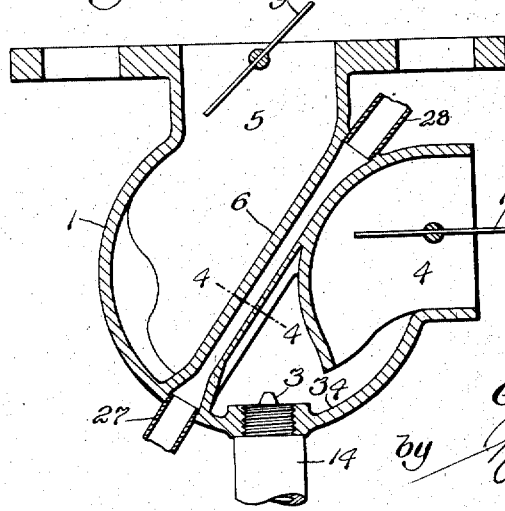
Fig. 3 is a vertical, central section of a modified form of my invention.
Figure 4:
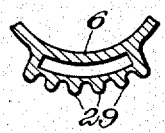
Fig. 4 is a detailed sectional view taken on the line 4—4 of Fig. 3.

In the modified form of my invention illustrated in Figs. 3 and 4 the drain pipe 26 shown in Figs. 1 and 2 has been omitted and the inner wall 6 of the outlet duct is made hollow whereby heating fluid may be circulated therethrough by means of pipes 27 and 28 threaded into the respective ends on the hollow wall. The passage through the wall is preferably wide in comparison with its thickness throughout the major portion of its length and is preferably provided on its outer surface with corrugations 29, as shown in Fig. 4. Near each of its ends the passage is decreased in width and increased in thickness, so that its area of cross-section is maintained substantially constant while its cross-sectional contour is gradually made to conform to the pipes 27 and 28. Obviously means other than heating fluid might be employed for heating the wall of the outlet duct, as for example, electrical heating coils disposed within the wall.

In the operation of each form of my improved carbureter the suction of the motor or other apparatus supplied with fuel by the device creates a suction in the outlet duct which draws a current of air into the inlet duct. This current of air is reflected from the surface 34 and is caused to pass across the fuel duct, thus aspirating fuel therefrom. The current of air carrying the fuel introduced thereinto from the fuel duct impinges against the wall 6 of the outlet duct which constitutes a baffle plate for causing the current of fuel mixture to be deflected and circulated about the chamber so as to be more thoroughly commingled before passing out through the opening of the outlet duct.

It will be noted that the elongate opening from the mixing chamber into the outlet duct, obtained by extending the curved wall 6 into comparatively close proximity to the side of the mixing chamber, is disposed in the region of a plane perpendicular to the paper and containing the dotted line 31 (Fig. 1). The general direction of the current of air passing from the inlet opening 4 across the mixing chamber is indicated by the dotted line 32 and the axis of the portion of the outlet duct adjacent the outlet opening is indicated approximately by the dotted line 33. Thus, the opening into the outlet duct is angularly disposed both with respect to the current of air across the mixing chamber and with respect to the outlet duct. Owing to the angular disposition of the opening with respect to the outlet duct one side of the opening, namely, the upper portion 7 in the illustrated modifications of the invention, is displaced, with respect to the other side, along the duct in the direction of the motor or other apparatus producing the suction or reduced pressure in the outlet duct. Hence, the pressure in the region of the portion 7 is somewhat lower than the pressures at other points of the outlet opening, the pressure gradually increasing from the upper to the lower side of the opening. When the suction in the outlet duct is comparatively small most of the air drawn from the mixing chamber into the outlet duct passes through the region 7 of lower pressure. As the suction increases and the volume of air drawn through the chamber increases correspondingly, increasing proportions of the opening are required to permit the increased quantity of air to pass to the outlet duct. As a result a current of air of small volume passes across the chamber in the general direction of the region 7, at a considerable distance from the fuel nozzle, and as the current of air increases in volume its direction is shifted downwardly. Obviously a current of air directed toward the upper portion of the outlet opening would pass over the fuel duct 3 at a greater distance therefrom than would a current of air directed toward the central or lower portion of the opening. It is also obvious that the amount of fuel inspirated from the fuel duct varies inversely as the distance of the current of air therefrom, the fuel being inspirated in increasing amounts, within certain limits, as the current of air is caused to approach the nozzle, the rate of increase depending upon the angle which the fuel duct makes with the current of air and upon other factors.

When the engine is running slowly or when for any other reason the suction in the outlet duct is comparatively small, the current of air passing through the mixing chamber (which is therefore of comparatively small volume) tends to take the shortest path across the chamber to the region of lowest pressure and is therefore directed toward the upper reduced portion 7 of the outlet opening. Owing to the presence of the baffle plate 6 this current of air does not pass directly to the upper portion of the opening, but it is directed upwardly in this general direction and passes across the fuel duct at a considerable distance from the opening of the fuel duct. Thus the inspirating action of this current of air is smaller than it would be if it were caused to pass more closely to the end of the fuel duct, and the amount of fuel inspirated from the duct is small in correspondence with the small volume of air passing through the mixing chamber. As the speed of the motor increases and the suction in the outlet duct increases correspondingly, the volume of air drawn through the mixing chamber increases in volume, and as the current increases in volume it spreads out over a larger area of the outlet opening inasmuch as the increased volume of air cannot pass out through the reduced upper portion of the opening notwithstanding the fact that the vacuum in this region is slightly higher than at other portions of the opening.

I have found that with the specific arrangements of elements shown in the drawings that the center of mass of the current of air passing across the mixing chamber will be suitably disposed with relation to the fuel duct under average operating conditions by increasing the width of the opening into the outlet duct at points intermediate the upper and lower portions thereof, as shown in Fig. 1. If the width of the opening into the outlet duct were of substantially uniform width throughout, the center of mass of the current of air passing across the chamber during the periods of heavy load would be disposed too close to the fuel duct, thereby inspirating too much fuel therefrom. It is, of course, desirable to increase the amount of fuel supply as the volume of the current of air increases, but it is also desirable to increase the fuel supply in the proper ratio with respect to increase of air. With my invention it is possible to cause the ratio of fuel to air to remain constant throughout the entire range of speed and load, or the ratio may be caused to vary in any desired manner throughout the range of speed and load by virtue of the fact, as I believe, that the distance from the center of mass of the current of air to the fuel duct varies in accordance with variations of the volume of the current of air passing through the mixing chamber depending upon the shape and disposition of the outlet opening.

The particular shape and disposition of the opening from the mixing chamber into the outlet duct is of prime importance. As above described, the current of air through the mixing chamber is directed toward the upper end or ends of the elongated outlet opening 7 when the engine is running light, and as the load is increased the current of air increases in volume and approaches more closely to the nozzle 3. If the elongate opening were of substantially the same width throughout, the current of air would approach the nozzle relatively rapidly and for most conditions of operation would thereby accelerate the supply of fuel to the mixing chamber too rapidly. However, by providing lateral enlargements such as illustrated at 8, or by otherwise regulating the effective size of the outlet opening throughout its length, the current of air, as it increases in volume, can be caused to approach the fuel duct only sufficiently rapidly to increase the aspirating effect at the proper rate.

The above described automatic regulation of the richness of the fuel mixture is made possible, in part, by the relative capacities of the air inlet and outlet ducts, the inlet duct preferably being larger than the outlet duct as before mentioned. With this difference in size the pressure within the mixing chamber remains substantially constant and substantially equal to the atmospheric pressure outside the mixing chamber throughout variations in the volume of the current of air being drawn through the chamber, since, owing to the large inlet opening, the pressure within the chamber does not appreciably decrease as the suction in the outlet duct increases inasmuch as air can readily flow into the chamber through the large inlet opening and thus maintain the pressures within and without the chamber substantially equalized. Consequently the flow of fuel from the fuel duct may be regulated almost exclusively by the current of air passing across the chamber and only to a small extent, if at all, by variations in pressure within the chamber. Thus the above described automatic regulation of the richness of the mixture in accordance with variations in the distance between the current of air and the fuel duct may be had substantially free from interference due to variations in the pressure within the mixing chamber.

However, it is to be understood that there is a slight variation in pressure in the mixing chamber and that this variation may be perfectly controlled by varying the cross-sectional area of the inlet opening, as by means of the valve 10, and that the automatic regulation may comprise the two variable factors instead of the one, viz., the variation in pressure as well as the variation in the direction of the current of air due to variation in its volume. By suitably proportioning these two variable factors the quality of the fuel mixture may be caused to remain constant, or to vary in any desired manner, throughout the range of motor speeds and loads.

The operation of the embodiment of my invention shown in Fig. 3 is substantially the same as that shown in Figs. 1 and 2. However, in Fig. 3 the opening into the outlet duct comprises two separate and distinct parts, separated by the heating duct 6, whereas in Fig. 1 the two sides of the outlet opening are connected by a narrow opening at the lower end of the duct. Furthermore, in Fig. 3 heating fluid may be circulated through the wall 6, thus permitting the use of comparatively heavy fuels, such as kerosene, inasmuch as the current of air and fuel striking the heated baffle wall 6 causes the heavy oil to be heated and vaporized.

While I have described the operation of my improved carbureter in connection with the type of motor now in common use wherein the fuel mixture is drawn from the carbureter to the motor by virtue of the suction or reduced pressure produced by the motor, it is to be understood that I contemplate using the carbureter with other types of motor as, for example, with the so-called constant pressure motor wherein the fuel mixture is not drawn into the motor during the forward stroke prior to the compression stroke but is forced into the cylinder at the end of the exhaust stroke, there being only two strokes in a cycle, viz., an explosion stroke and an exhaust stroke. With this type of motor the inlet duct would be connected with a supply of air under pressure instead of communicating directly with the atmosphere as above described. The operation of the device would be substantially the same as above described, however, inasmuch as the difference between the pressure in the outlet and inlet ducts respectively would be substantially the same, both the outlet and inlet pressures having been increased substantially equal amounts. Hence, upon opening the port connecting the outlet duct with the motor, the pressure in the region of the upper portion 7 of the outlet duct would be reduced more than at the lower or intermediate portions of the outlet duct opening and a current of air of small volume would pass across the mixing chamber at a greater distance from the fuel duct than would currents of air of relatively large volume, as more fully set forth above.

The location of the fuel float-chamber immediately below the delivery nozzle 3 is important, because the effective level, or head, of the liquid fuel, is not affected by changes in the inclination of the carbureter to the horizontal normal position, changes which take place constantly when a motor is traveling on the road. Since no mechanical regulation is necessary or desirable in this improved carbureter, the liquid fuel inlet is not so constricted as in carbureters heretofore in general use, and any change of relative level between the liquid in the float chamber and the delivery opening of the liquid duct 3 will affect my improved carbureter more than a similar change will affect the behavior of carbureters of the present standard forms.

Throughout the specification and claims reference is made to "air" as the fluid combined with the fuel, but I have used the term in a generic sense intending to include by the term any fluid suitable for use in a carbureter of the character described. Furthermore, while I have shown a substantially spherical mixing chamber I do not desire to be limited in the broader aspect of my invention to this particular form, inasmuch as other shapes might be employed with baffle plates disposed therein to perform the functions of the surfaces 29, 30, etc., of the spherical mixing chamber illustrated.

I claim:

1. A carbureter comprising a mixing chamber, a fuel duct for introducing fuel into said chamber, an inlet duct and a mixture delivery duct for passing a current of air through the region of said fuel duct each extending into said mixing chamber and presenting their respective openings to the side thereof, one on one side and the other on the other side of the fuel inlet duct, a baffle member disposed in the path of said current of air at a point beyond said fuel duct, and means for heating said baffle member.

2. A carbureter comprising a mixing chamber, a fuel duct for introducing fuel into said chamber, and inlet and outlet ducts in said chamber respectively on opposite sides of said fuel duct for passing a current of air through the region of said fuel duct at an angle thereto thereby aspirating fuel therefrom, at least one of said ducts having an elongated opening disposed transversely of the path of the current of air and transversely of the one duct so that as the volume of said current of air varies by virtue of variations of pressure in said outlet duct the amount of fuel aspirated from said fuel duct varies in direct proportion to said variation of volume of air.

3. A carbureter comprising a mixing chamber, a fuel duct for introducing fuel into said chamber, an inlet duct and a mixture delivery duct for passing a current of air through the region of said fuel duct each extending into said mixing chamber and presenting their respective openings to the side thereof, one on one side and the other on the other side of the fuel inlet duct, one side of said outlet duct being disposed in the path of said current of air at a point beyond said fuel duct and constituting a baffle member, and means for heating said baffle member.

4. A carbureter comprising a mixing chamber, a fuel duct for introducing fuel into said chamber, and inlet and outlet ducts in said chamber respectively on opposite sides of said fuel duct for passing a current of air through the region of said fuel duct at an angle thereto thereby aspirating fuel therefrom, said outlet duct having elongated openings laterally displaced on opposite sides of the path of said current of air and angularly disposed with relation to said outlet duct, whereby as the volume of said current of air varies by virtue of variations of pressure in said outlet duct the amount of fuel aspirated from said fuel duct varies in proportion to said variation of volume of air.

5. A carbureter comprising a mixing chamber, an air inlet duct on one side of said chamber for admitting a current of air into said chamber, an outlet duct on the other side of said chamber for delivering said current of air from said chamber, the outlet duct having an elongate opening disposed obliquely to the outlet duct, a fuel duct intermediate said inlet and outlet ducts for introducing a jet of fuel into said current of air transversely thereof, and a baffle surface in the path of said current of air beyond said fuel duct for causing the air and the fuel to commingle before passing to said outlet duct, said outlet duct being arranged transversely of said current of air and having an enlarged portion intermediate its ends at one side of said current of air.

6. A carbureter comprising an approximately spherical mixing chamer, a liquid fuel duct entering said chamber, and an air inlet duct and a mixture delivery duct for passing a current of air through the region of said fuel duct, each extending into said mixing chamber and presenting their respective openings to the side thereof, one on one side and the other on the other side of the fuel inlet duct, said outlet duct having an elongate opening of varying width transversely positioned with relation to the air inlet and fuel ducts so that the distance of said current of air from said fuel duct varies in inverse proportion to the volume of air passing through said chamber, whereby the richness of the mixture is automatically regulated for different rates of mixture supply.

7. A carbureter comprising a mixing chamber, a fuel duct for introducing fuel into said chamber, and inlet and outlet ducts in said chamber respectively on opposite sides of said fuel duct for passing a current of air through the region of said fuel duct at an angle thereto thereby aspirating fuel therefrom, said outlet duct having an elongated opening angularly disposed with relation to said current of air and with relation to said outlet duct, whereby as the volume of said current of air varies by virtue of variations of pressure in said outlet duct the distance of said current of air from said fuel duct and the amount of fuel aspirated from said fuel duct vary in proportion to said variation of volume of air, 8. A carbureter comprising a mixing chamber, a fuel duct for introducing fuel into said chamber, and inlet and outlet ducts in said chamber respectively on opposite sides of said fuel duct for passing a current of air through the region of said fuel duct at an angle thereto thereby aspirating fuel therefrom, said outlet duct having an elongate opening laterally displaced from the path of said current of air and angularly disposed with relation to said outlet duct, whereby as the volume of said current of air varies by virtue of variations of pressure in said outlet duct the distance of said current of air from said fuel duct and the amount of fuel aspirated from said fuel duct varies in proportion to said variation of volume of air.

9. A carbureter comprising an approximately spherical mixing chamber, a liquid fuel duct entering said chamber, and an air inlet duct and a mixture delivery duct each extending into said mixing chamber and presenting their respective openings to the side thereof, one on one side and the other on the other side of the fuel inlet duct, whereby a current of air may be passed through said chamber, said outlet duct having an arcuate opening surrounding a portion of the path of said current of air, said opening having an enlarged portion so disposed intermediate its ends that the distance of said current of air from said fuel duct varies in inverse proportion to the volume of air passing through said chamber, whereby the richness of the mixture is automatically regulated for different rates of mixture supply.

10. A carbureter comprising a mixing chamber, an air inlet duct on one side of said chamber for admitting a current of air into said chamber, a mixture outlet duct on the other side of said chamber, a fuel duct intermediate said inlet and outlet ducts for introducing a jet of fuel into said chamber, a baffle surface within the said chamber disposed in the path of the incoming current of air for causing the air to pass across the said chamber in the region of said jet of fuel, a baffle surface in the path of said current of air beyond said fuel duct for causing the air and the fuel to commingle before passing to said outlet duct, and means for heating said baffle surface, said inlet and outlet ducts being shaped and positioned with relation to said fuel duct so that the jet of fuel is supplied substantially centrally of the said current of air and in proportion to the volume of said current of air.

11. A carbureter comprising a mixing chamber, a fuel duct for introducing fuel into said chamber, and inlet and outlet ducts in said chamber respectively on opposite sides of said fuel duct for passing a current of air through the region of said fuel duct at an angle thereto thereby aspirating fuel therefrom, said outlet duct having an elongate opening laterally displaced from the path of said current of air and angularly disposed with relation to said outlet duct, said opening comprising a portion gradually decreasing in width in the direction of said outlet duct, whereby as the volume of said current of air varies by virtue of variations of pressure in said outlet duct the distance of said current of air from said fuel duct and the amount of fuel aspirated from said fuel duct varies in proportion to said variation of volume of air.

12. A carbureter comprising a mixing chamber, a fuel duct for introducing fuel into said chamber, and inlet and outlet ducts in said chamber respectively on opposite sides of said fuel duct for passing a current of air through the region of said fuel duct at an angle thereto thereby aspirating fuel therefrom, said outlet duct having elongate openings laterally displaced on opposite sides of the path of said current of air and angularly disposed with relation to said outlet duct, each of said openings comprising a portion gradually decreasing in width in the direction of said outlet duct, whereby as the volume of said current of air varies by virtue of variations of pressure in said outlet duct the distance of said current of air from said fuel duct and the amount of fuel aspirated from said fuel duct vary in proportion to said variation of volume of air.

13. A carbureter comprising a mixing chamber, an air inlet duct on one side of said chamber for admitting a current of air into the chamber, and an outlet duct on the other side of the chamber for delivering said current of air from the chamber, the outlet duct communicating with the chamber through an elongate opening disposed obliquely to the outlet duct and transversely of said current of air, and the elongate opening varying in width throughout at least a portion of its length.

14. A carbureter comprising a mixing chamber, an air inlet duct on one side of said chamber for admitting a current of air into the chamber, and an outlet duct on the other side of the chamber for delivering said current of air from the chamber, the outlet duct communicating with the chamber through an elongate opening disposed obliquely to the outlet duct and transversely of said current of air, and the elongate opening gradually increasing in width from one end toward the other end throughout a portion of its length.

15. A carbureter comprising a mixing chamber, an air inlet duct on one side of said chamber for admitting a current of air into the chamber, and an outlet duct on the other side of the chamber for delivering said current of air from the chamber, the outlet duct communicating with the chamber through an elongate opening disposed obliquely to the outlet duct and transversely of said current of air, and the elongate opening increasing in width from the advance end toward the other end.

Signed by me at Boston, Massachusetts, this 26th day of June 1916.

GEORGE M. BROWN.